United States Patent [19]

Clementz et al.

[11] Patent Number: 5,645,661
[45] Date of Patent: Jul. 8, 1997

[54] TIRE SIDEWALL

[75] Inventors: Michel Clementz, Arlon; Gilbert Feller, Burden; Raymond Merx, Junglinster, all of Belgium

[73] Assignee: The Goodyear Tire & Rubber Company, Akron, Ohio

[21] Appl. No.: 555,739

[22] Filed: Nov. 9, 1995

[51] Int. Cl.⁶ ............................... B60C 13/02
[52] U.S. Cl. ........................... 152/523; 152/524
[58] Field of Search ..................... 152/523, 524, 152/DIG. 12, 522; D12/152

[56] References Cited

U.S. PATENT DOCUMENTS

| | | |
|---|---|---|
| D. 171,451 | 2/1954 | Kraft . |
| D. 204,585 | 4/1966 | Vizina, Jr. ............... D90/20 |
| 1,448,286 | 3/1923 | Comstock . |
| 1,635,077 | 7/1927 | Erskine . |
| 1,784,118 | 12/1930 | Smithers ................ 152/523 |
| 2,082,928 | 6/1937 | Wilhelmy . |
| 2,109,000 | 2/1938 | Waldo, Jr. . |
| 2,807,564 | 9/1957 | Mitchell . |
| 4,198,774 | 4/1980 | Roberts et al. ............ 40/587 |
| 4,343,342 | 8/1982 | McDonald ............... 152/523 |
| 4,625,101 | 11/1986 | Hinks et al. ............. 235/462 |
| 4,823,856 | 4/1989 | Roberts .................. 152/523 |
| 4,900,378 | 2/1990 | Wistehuff ................. 156/63 |
| 5,263,525 | 11/1993 | Yamashita ............... 152/523 |
| 5,303,758 | 4/1994 | Clementz et al. ......... 152/523 |

FOREIGN PATENT DOCUMENTS

| | | |
|---|---|---|
| 4111345 | 11/1991 | Germany . |
| 63-106106 | 5/1988 | Japan ...................... 152/523 |
| 138775 | 2/1920 | United Kingdom . |
| 330432 | 6/1930 | United Kingdom . |

OTHER PUBLICATIONS

Design Patent Application Ser. No. 29/041,957 filed Jul. 27, 1995.
Design Patent Application Ser. No. 29/041,958 filed Jul. 27, 1995.

Primary Examiner—Geoffrey L. Knable
Attorney, Agent, or Firm—David L. King

[57] ABSTRACT

An improved tire sidewall 12 for a tire 10 has an annular outer surface 11, the annular outer surface 11 having a design pattern having a first pattern 15 and a second pattern 17. The second pattern 17 is superimposed over a portion of ridges 20 of the first pattern 15. The improvement has the ridges 20 of the first pattern 15 within a sidewall sector 13 defined by parallel planes passing through a plane (T) parallel to the equatorial plane of the tire 10 and perpendicular to the axis of rotation of the annular tire sidewall 12 to form lines 21 all having the same slope (x/y). Preferably the ridges 20 have a substantially triangular cross section having an included angle of about 100° at the apex. The sectors 13A, 13B, 13C and 13D can be any portion of the tire sidewall 12, preferably the sectors 13 being quadrants, halves, or the whole annular surface 11. The resulting patterns yield a decorative sidewall 12 having unique contrasting light and dark appearance.

10 Claims, 10 Drawing Sheets

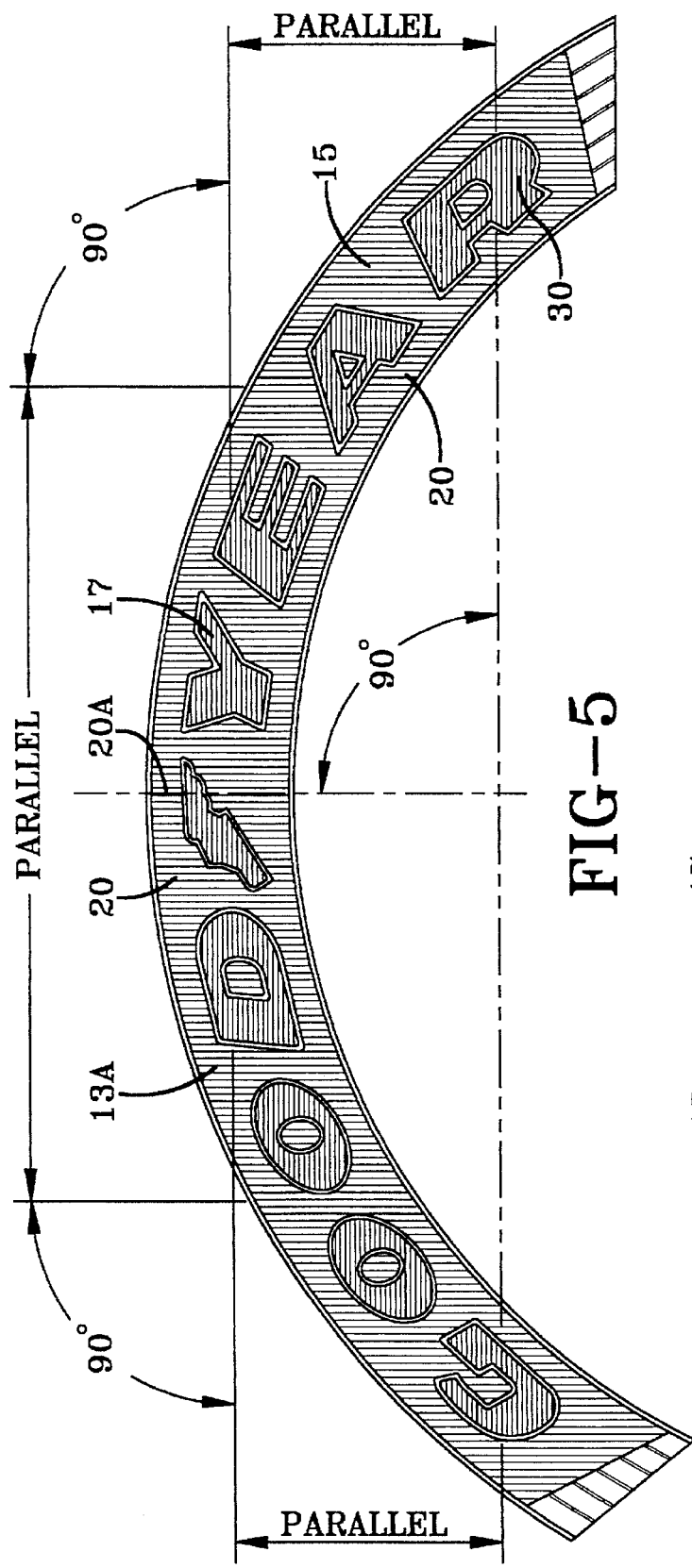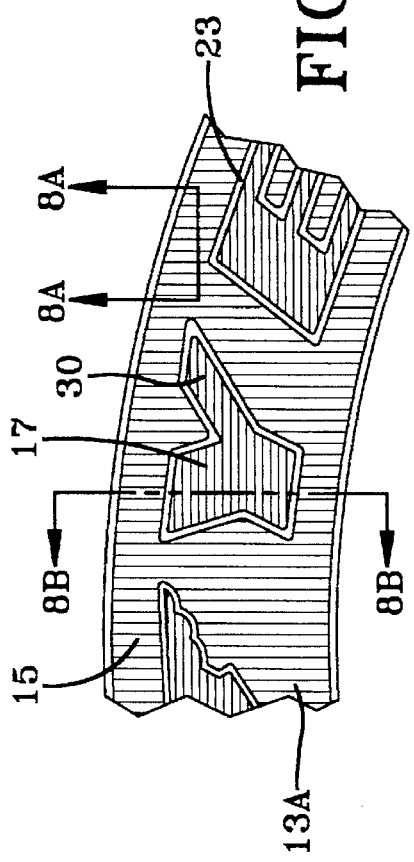

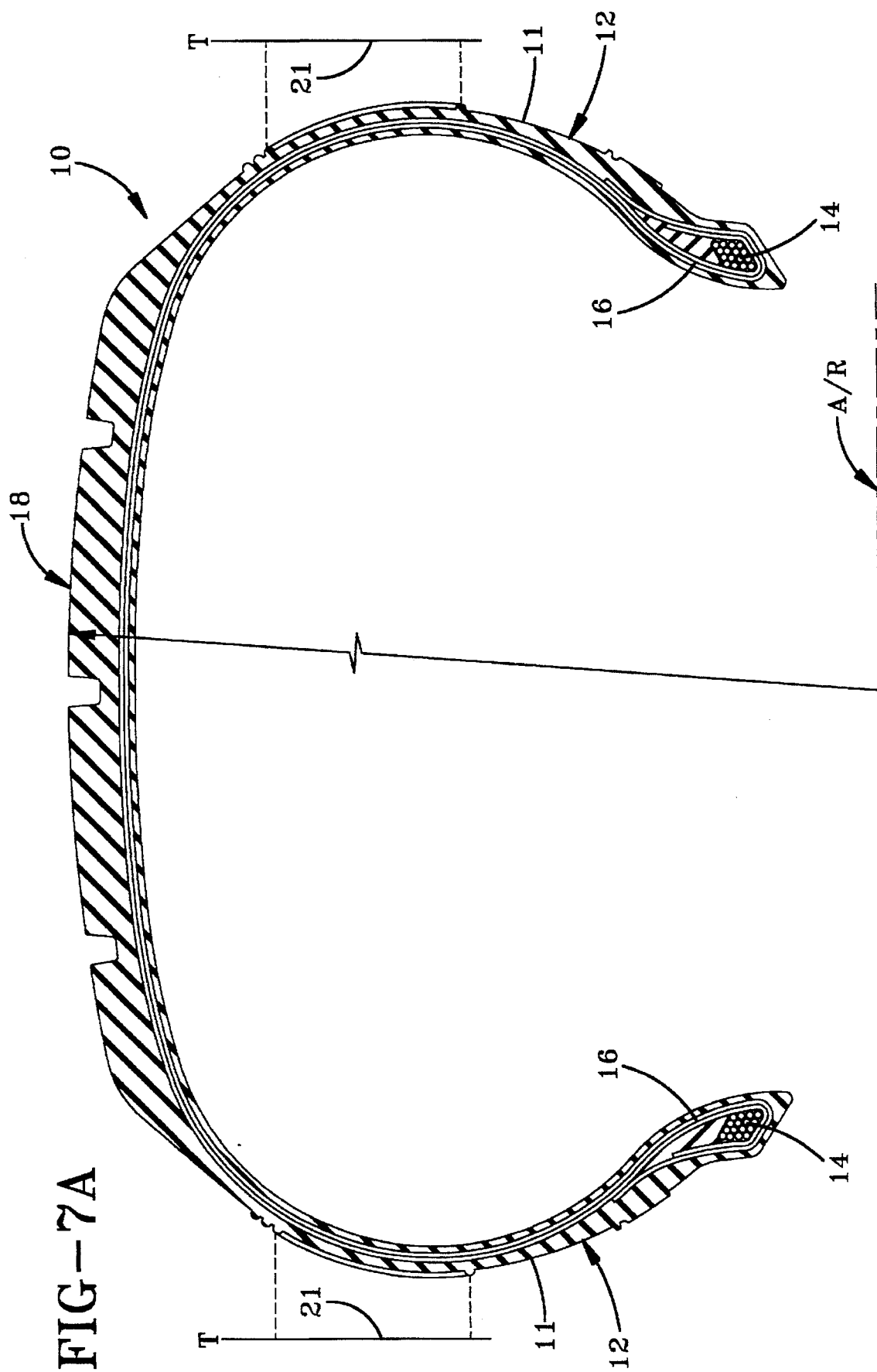

TIRE SIDEWALL

This invention is particularly applicable to the black sidewalls of rubber tires. More specifically, this invention relates to at least two design patterns used on the surface of a tire sidewall, the patterns each comprising pluralities of parallel ridges oriented to yield a striking visual appearance.

Manufacturers have for many years placed numerals, letters, characters or other designations upon the sidewalls of tires to enhance the appearance and marketability of their products. Such markings are described in U.S. Pat. Nos. 4,198,744 and 4,823,856.

The subject matter of U.S. Pat. No. 4,198,774, issued Apr. 22, 1980, was invented by Roberts and Lowther. The invention describes the use of lineal projections which are substantially straight, parallel, and of substantially identical cross section to form indicium. An indicium is described as a letter or numeral or the like.

The latter issued patent of Mr. Charles W. Roberts, U.S. Pat. No. 4,823,856, issued Apr. 25, 1989, describes the use of serrated outline markings for the sidewall of a tire. The invention relates to a design of a substantially flat ungrooved portion surrounded by a serrated portion which includes a plurality of ribs separated by grooves. The combination of the flat design surrounded by a serrated portion defines an indicium.

U.S. Pat. No. 5,303,758 taught the use of at least two distinctive design patterns which improves the visual appearance of an opaque article by increasing the visual contrast of the surfaces of articles. The invention was particularly well-suited for the sidewall of a tire, particularly a black sidewall tire. The combination of design patterns in at least one embodiment of that invention, had the effect of making the sidewall markings boldly stand out when viewed from an angular perspective of 60° or less relative to a plane parallel to the sidewall wall of the tire. The design patterns uniquely changed in contrast relative to each other in an inverse relationship as a function of the position of the tire. Unfortunately, the changing contrast meant that the casual observer reading the lettering on the tire sidewall was forced to change his perspective to read the entire name of the tire or its manufacture. The present invention dramatically has improved the ability of the tire observer to read an entire tire sidewall without causing the observer to change his perspective. In one embodiment the sidewall is divided into sectors of different contrast such that the entire superimposed pattern is strikingly readable within each contrasting adjacent sector, thus, enabling the reader of the tire sidewall to appreciate the message the tire manufacturer was trying to convey on its tire sidewall without the difficulty experienced with the prior art tires.

SUMMARY OF THE INVENTION

An improved tire sidewall 12 has an annular outer or exterior surface 11, the annular outer surface 11 having a design pattern. The design pattern has a first design pattern 15 and second design pattern 17.

The first pattern 15 has a plurality of ridges 20 of similar cross sectional shape. Each ridge 20 is inclined relative to the circumferential direction.

The second design pattern 17 is superimposed over a portion of the first design pattern 15. In the preferred embodiment, the second pattern 15 in at least one sector has a plurality of spaced ridges 30 and each ridge 30 is substantially parallel to an adjacent ridge 30 of the second pattern 17 and extends outwardly from the first pattern 15 and in an angular direction between 45° and 90° relative to the ridges 20 of the first pattern 15. This combination of first and second patterns 15, 17 have a visual appearance wherein when the first pattern 15 appears shiny or highly light reflective, the second pattern 17 appears dark and conversely when the second pattern 17 appears shiny or highly light reflective the first pattern 15 appears dark, yielding an inverse contrast between the first and second pattern 15, 17.

The improvement in at least one sidewall sector 13 extending circumferentially 360° or less around the tire sidewall annular outer surface 11 is the ridges 20 of the first pattern 15 are defined by a parallel planes passing through a plane (T) parallel to the equatorial plane (EP) of the tire and perpendicular to the axis of rotation (A/R) of the annular tire sidewall 12 to form lines 21 all having the same slope (x/y) when projected onto the plane T. In the preferred embodiment the slope (x/y) is a constant along the length of the line 21.

The cross sectional shape of the ridges 20 of the first pattern 17 are preferably substantially triangular having an included angle θ at the apex of about 100°, or in the range of 70° to about 130°, preferably 90° to 110°.

The arc length of the sector 13 can be of any length preferably at least one sixth the circumference of the sidewall 12 more preferable sectors 13 are quadrants. Alternatively, the sector 13 can be the entire 360° circumference or 180° to yield a particular look or appearance. The angle the reflected light forms with a normal to the reflecting surface is similar to the angle the incident light forms with this normal. If the observer sees the light source under such an angle, he feels that the light is reflected otherwise he has the impression that the light is deflected or absorbed. Each sector 13 can be spaced by an ornamental design 23 establishing the boundary ends of each sector 13. The resultant effect is a wide decorative band with visually striking alpha numeric markings which are clearly more discernable and readable to an observer. The legend or message molded into the sidewall 12 contrasting vividly against the background pattern of first ridges 20 within each sector 13 enabling the reader of the sidewall 12 to at a glance see the entire message. The prior art ridges of background pattern being radially inclined or sloped at a constant angle relative to all radial lines originating from the axis prevented this feature from being available.

Definitions

"Angle of Incidence" means the angle formed by a line from a ray of light falling on a surface and a perpendicular arising from the point of incidence.

"Axial" and "axially" means the lines or directions that are parallel to the axis of rotation of the tire.

"Circumferential" means lines or directions extending along the perimeter of the surface of the annular tread perpendicular to the axial direction.

"Light deflection" means that as light strikes a surface, the reflected light is angularly directed relative to the angle of incidence of the light source yielding what appears to be a light absorbing characteristic to an observer who is positioned in general alignment with the angle of incidence.

"Light reflection" means that as light strikes an object, the reflected light is generally aligned with the angle of incidence yielding what appears to be a shiny or reflective characteristic to an observer who is positioned in general alignment with the angle of incidence.

"Radial" and "radially" mean directions radially toward or away from the axis of rotation of the tire.

"Sidewall" means that portion of a tire between the tread and the bead.

"Tread" means that portion of the tire that comes into contact with the road under normal inflation and load.

BRIEF DESCRIPTION OF THE DRAWINGS

FIG. 5 illustrates an enlarged view of one sector of the tire of FIG. 4.

FIG. 5A illustrates an enlarged view of a portion of the sector taken from FIG. 5.

FIG. 7A is a cross sectional view of the tire of FIG. 4 further depicting the plane (T).

DETAILED DESCRIPTION OF THE INVENTION

Figure 1:
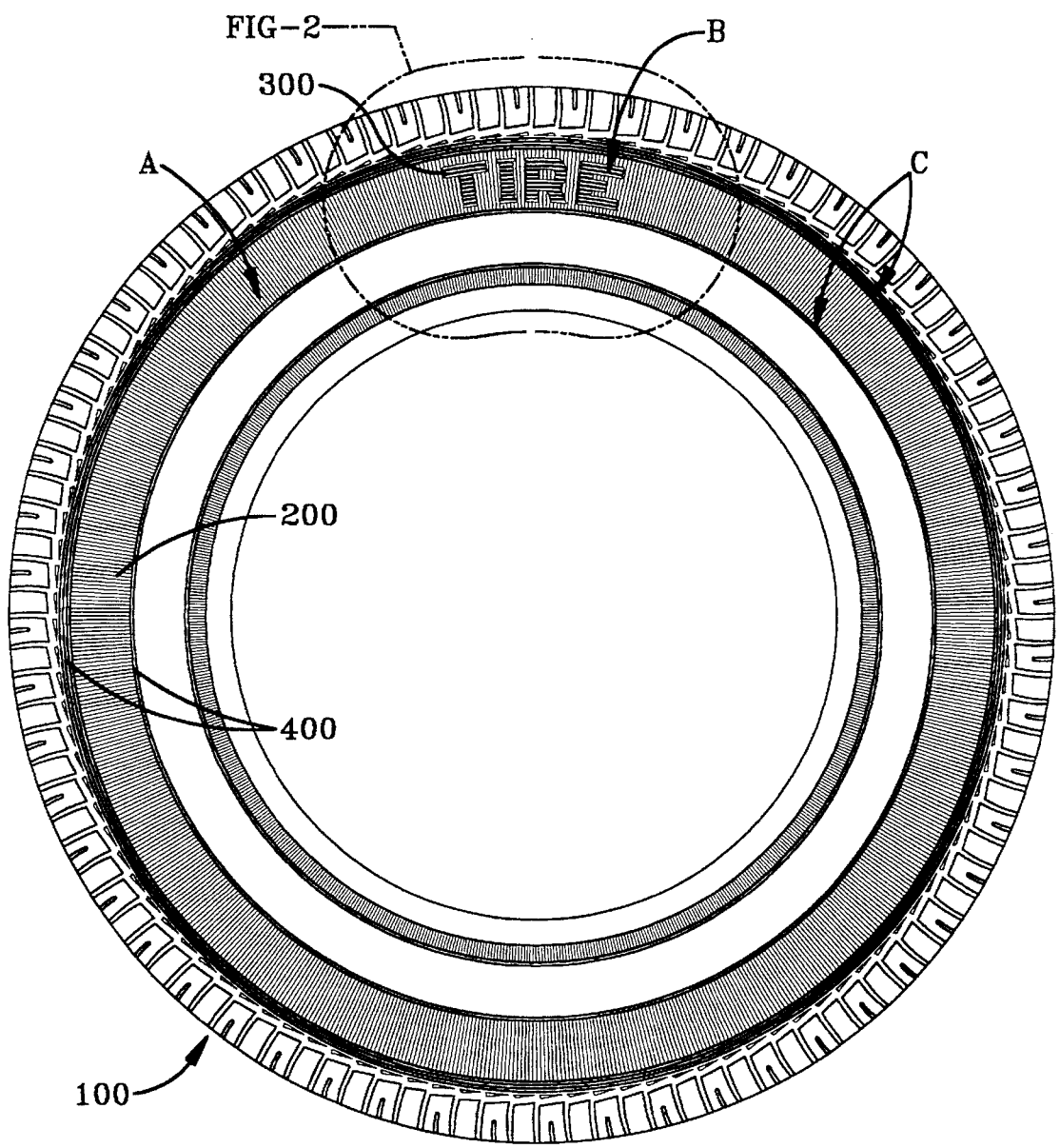
FIG. 1 illustrates a side view of a prior art tire.
Figure 2:
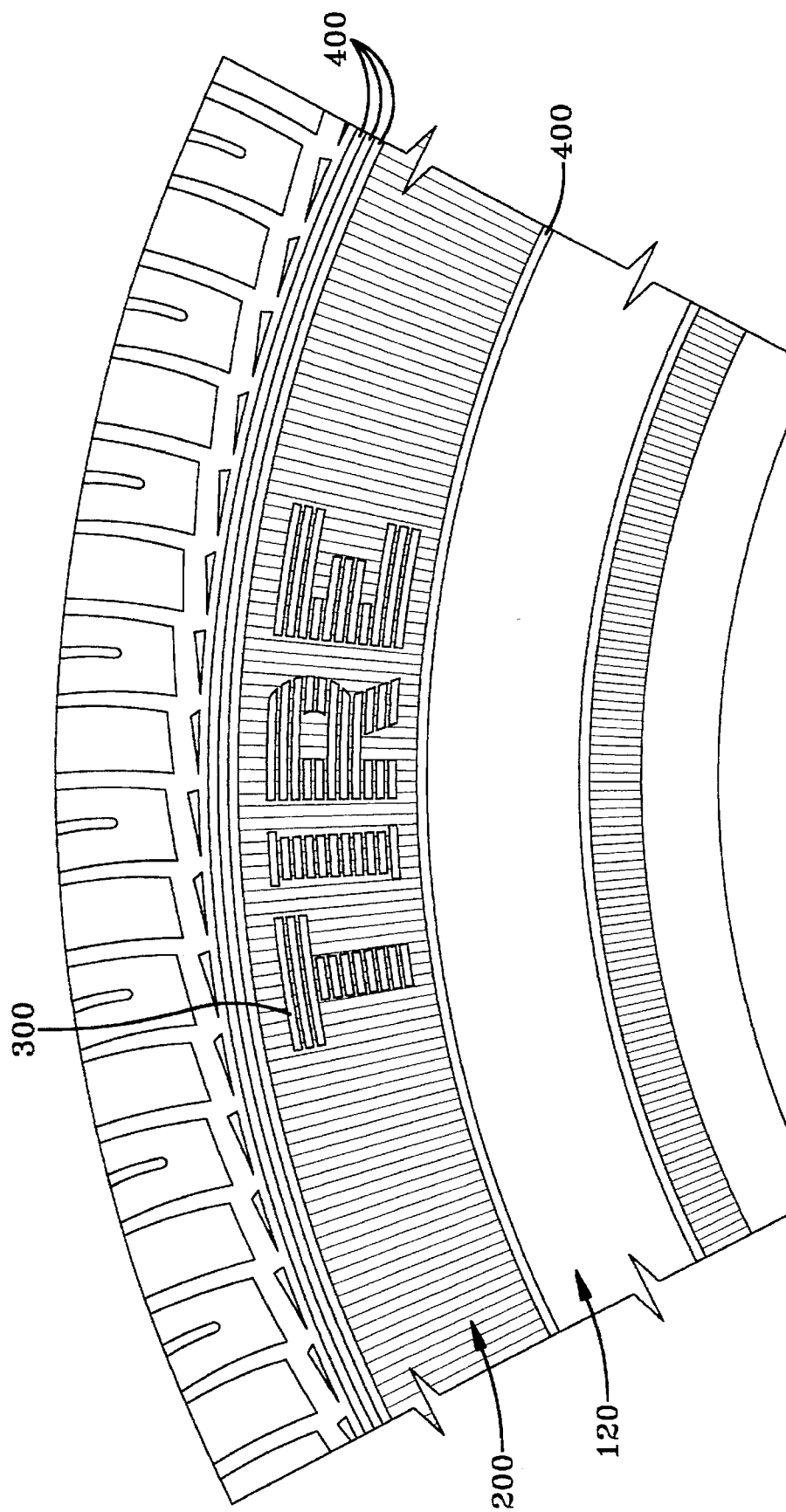
FIG. 2 illustrates an enlarge view of a portion of the prior art tire of FIG. 1.
Figure 3:
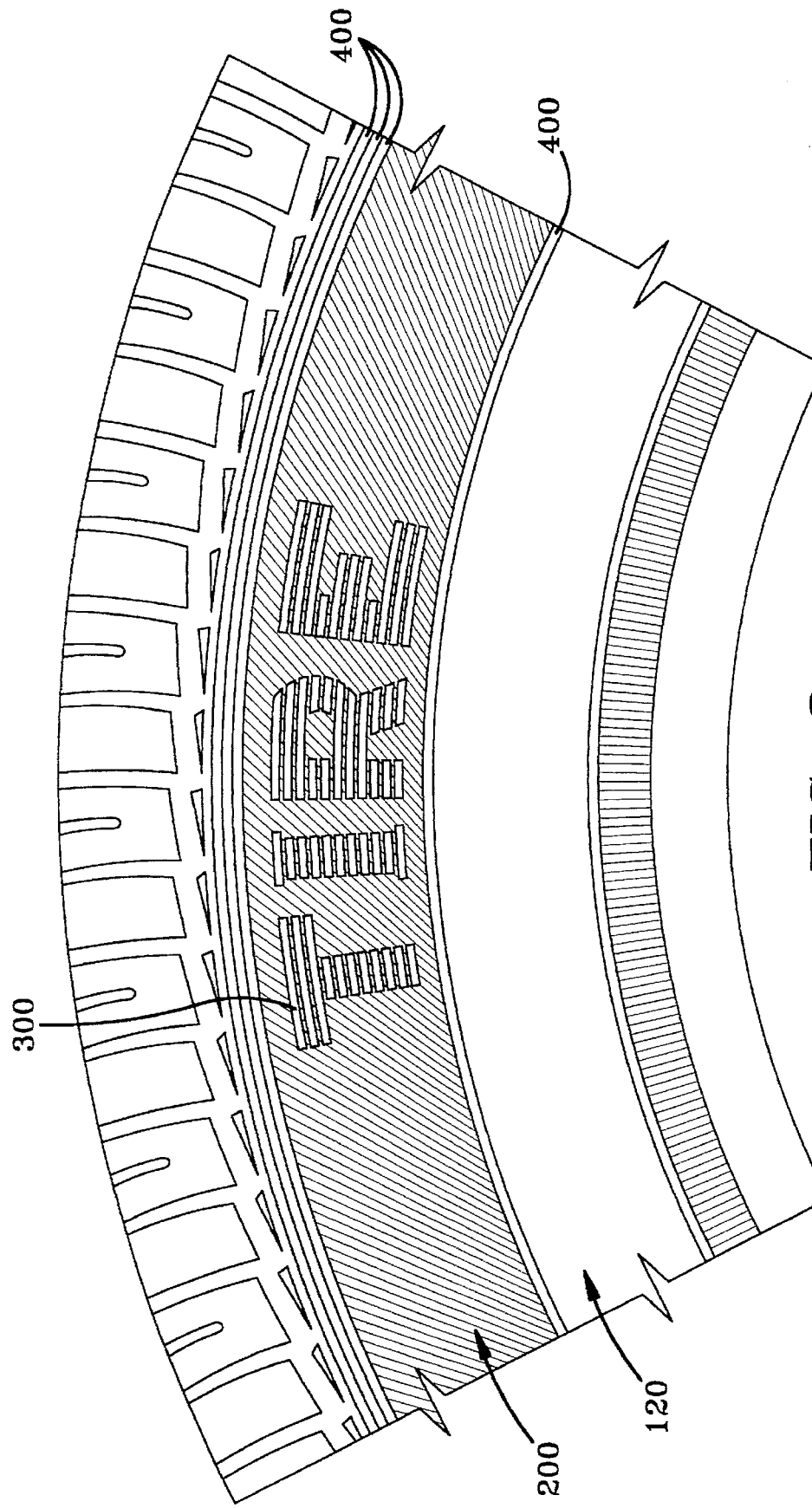
FIG. 3 illustrates an alternative prior art tire.

FIGS. 1 through 3 illustrate the prior art tire sidewall disclosed in U.S. Pat. No. 5,303,758.

In the prior art embodiment shown in exemplary FIG. 1, pattern A forms a wide decorative band comprised of ridges 200. The ridges 200 of pattern A each extend in a substantially radial direction, In the illustrated prior art embodiment, ridges 200 of pattern A extend equally in length and have similar cross sectional shapes. Each radially extending ridge 200 appears to be substantially parallel to an adjacent ridge 200.

Design pattern B is illustrated in FIG. 1 superimposed over a portion of the design pattern A. Pattern B has a plurality of parallel ridges 300 extending perpendicularly relative to the ridges 200 of the superimposed portion of pattern A.

As illustrated in FIG. 1, the plurality of ridges 300 of pattern B are oriented so as to form the word TIRES, the word TIRES overlaying or being superimposed over some of the ridges 200 of pattern A. Pattern. A forms a background for the pattern B markings.

As further illustrated in FIG. 1, pattern C has a plurality of parallel of parallel ridges 400 perpendicularly oriented relative to the ridges 200 of pattern A and wherein the ridges 200 of pattern A intersect two ridges 400 of pattern C. In the prior art embodiment illustrated in FIG. 1, pattern C consists of one or more adjacent circumferentially-continuous ridges 400 radially outward of the ridges 20 of pattern A and one or more circumferentially-continuous annular ridge 400 radially inward of the ridges 200 of pattern A.

FIG. 2 is an enlarged view of a portion of the prior art design patterns A, B and C. The ridges 200 of pattern A are preferably of trapezoidal shape which approximate a triangular cross section. The bases of the trapezoidal cross sections are positioned very close or intersect such that pattern A exhibits minimal surfaces parallel to the tire sidewall 120. The use of these trapezoidal cross sections yield a generally light deflecting or nonreflective background when viewed from a perpendicular position relative to the sidewall 120.

The design pattern B as illustrated at FIG. 3 is comprised of a plurality of ridges 300 having a trapezoidal shape approximating flat rectangular or square cross sectional shapes. The ridges are spaced a sufficient distance to provide a light shadowing space between a flat light reflecting surface. The flat surfaces yield a pattern exhibiting a light contrasting appearance whereby the observer can readily distinguish the design patterns of B which stand out when compared of the background patterns A and C.

FIG. 3 illustrates a second embodiment of the prior art invention wherein the background pattern had the ridges 200 slanted. The ridges 200 as illustrated are oriented at a 45° angle relative to the radial direction. Each ridge is of equal length and substantially oriented parallel to the adjacent ridge 200. The plurality of parallel ridges 300 are superimposed over a portion of the slanted ridges 200. The ridges 300 extend generally circumferentially and are arranged in the exemplary tire sidewall of FIG. 3 forming the word TIRE. The third pattern of ridges 400 is illustrated circumferentially bordering the background pattern 200. Each of the ridges 200 intersect two of the ridges 400.

This prior art invention as described above had several distinct advantages in addition to improved appearance. The ridges 300 of pattern B are believed to be preferable to a solid indicium because the use of multiple ridges tend to mask or conceal slight molding imperfections. A solid indicium tend to highlight any small imperfection because the observer's attention is drawn to the imperfection.

A second benefit of the invention is that the intersections of the ridges 200 of pattern A with the annular ridges 300 of pattern B and the ridges 400 of pattern C provide improved venting of entrapped gases. The improved venting greatly minimizes the occurrence of surface blemishes that occur as a result of entrapped gases during the molding process.

The combination of reduced occurrence of surface blemishes and the masking of those that might occur greatly reduces the potential of producing a cosmetically unacceptable product.

The visual appearance of the prior tire 100 was an improvement over the commercially available products. The design pattern B yielded a striped character having a dynamic visual impression. The wide decorative band formed by pattern A provided a background which enhanced the characters formed by pattern B. The wide decorative band of pattern A had changing light reflection characteristics as a function of tire position and the observer's perspective view. The ridges 200 of pattern A tended to deflect light at the top and bottom of the tire while exhibiting a shiny appearance to the left or right.

It has been observed that a tire made according to the present invention has characters of changing visual appearance as a function of the observer's position relative to the tire. In particular, when the observer looks at the tire sidewall from an angular perspective and when pattern B is oriented at either 90° or 270° relative to the top of the tire, the characters of pattern B appear dark against the shiny or highly light reflective pattern A yielding a high contrast with the background. When pattern B is at 0° or 180°, the pattern B appears light against the dark pattern A yielding an inverse contrast opposite to the light reflective appearance when pattern B is the 90° or 270° position. This changing visual appearance adds to the unique aesthetic quality and appeal of this sidewall design.

The other prior art tires of the past were designed to maximize contrast by using a combination of protruding flat letters or outlined lettering on a flat background, striped letters on a flat background, or flat letters on a striped background. The use of striped lettering in combination with a striped background as described above achieved a novel contrast changing appearance unachieved in earlier tire sidewall marking.

The prior art tire 100 of FIG. 1 through 3 although a significant advancement had one significant drawback. The background pattern 200 being radially inclined or extending meant that as one viewed the lettering or markings around the tire the background was progressively changing in contrast. This meant that from any given angular perspective one optimum contrast point was achieved and as one deviated from the given angle the contrast between the lettering and the background became less pronounced in appearance. If the word spelled out was large the circumferential extent of the combination of letters would make it difficult to read the entire word at a glance. As noted above the lettering was contrasted differently around the tire.

An object of the present invention is to provide a tire sidewall background achieving the light contrasting benefit of the prior art patent U.S. Pat. No. 5,303,758 in a novel way such that all the lettering within the entire sidewall or a large sector could be read at a glance.

Figure 4:
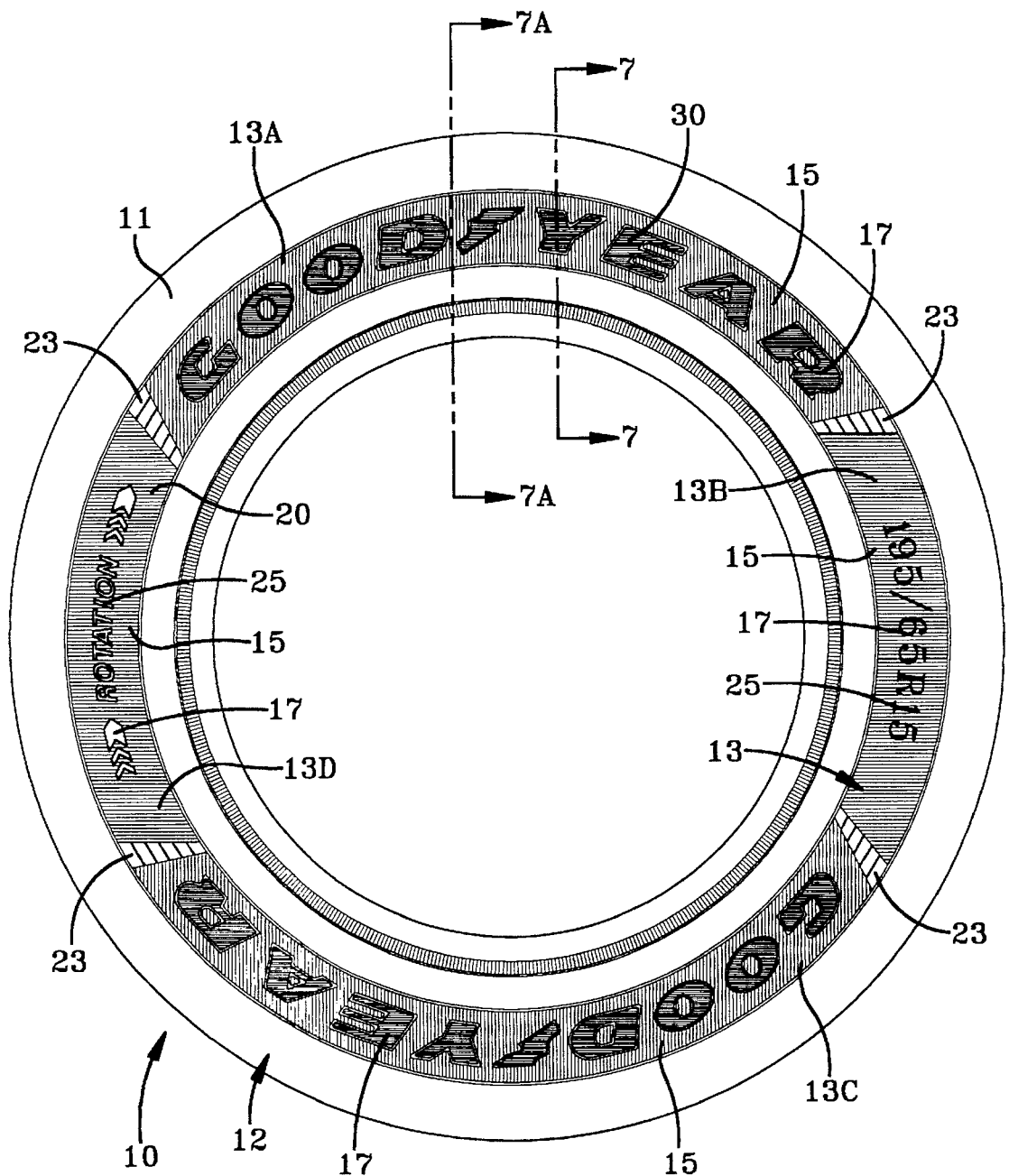
FIG. 4 illustrates an exemplary side view of the tire according to the present invention.

In FIG. 4 a first embodiment of the invention illustrates an exemplary tire sidewall 12. The sidewall 12 has a wide decorative band 13, the band being divided into four sectors, 13A, 13B, 13C and 13D. As illustrated, the sectors each have a plurality of ridges 20 forming a first pattern 15 which form the wide decorative band. Superimposed over the ridges 20 of the first pattern within each sector 13A–13D is a second design pattern 17 comprised of numerals, letters or other indicia. The illustrated sidewall 12 is such that within a given sector a generally uniform light reflection is achieved by a novel arrangement of the first pattern 15 of ridges 20 which form the background pattern of the wide decorative band 13.

As illustrated in FIG. 5, the sector 13A has the parallel ridges 20 of the first pattern 15 oriented such that one ridge 20A in the middle is vertically oriented and each ridge 20 spaced on either side of the central ridge 20A is parallel and similarly inclined as that of the central ridge 20A. The ridges 30 of the second pattern 17 forming the lettering are oriented in the range of 45° to 90° relative the first ridges 20. As illustrated the ridges 30 of the second pattern 17 are preferably all sloped at the same angle, the angle being most preferably 90° relative to the ridges 20 of the first pattern 15.

Figure 6:
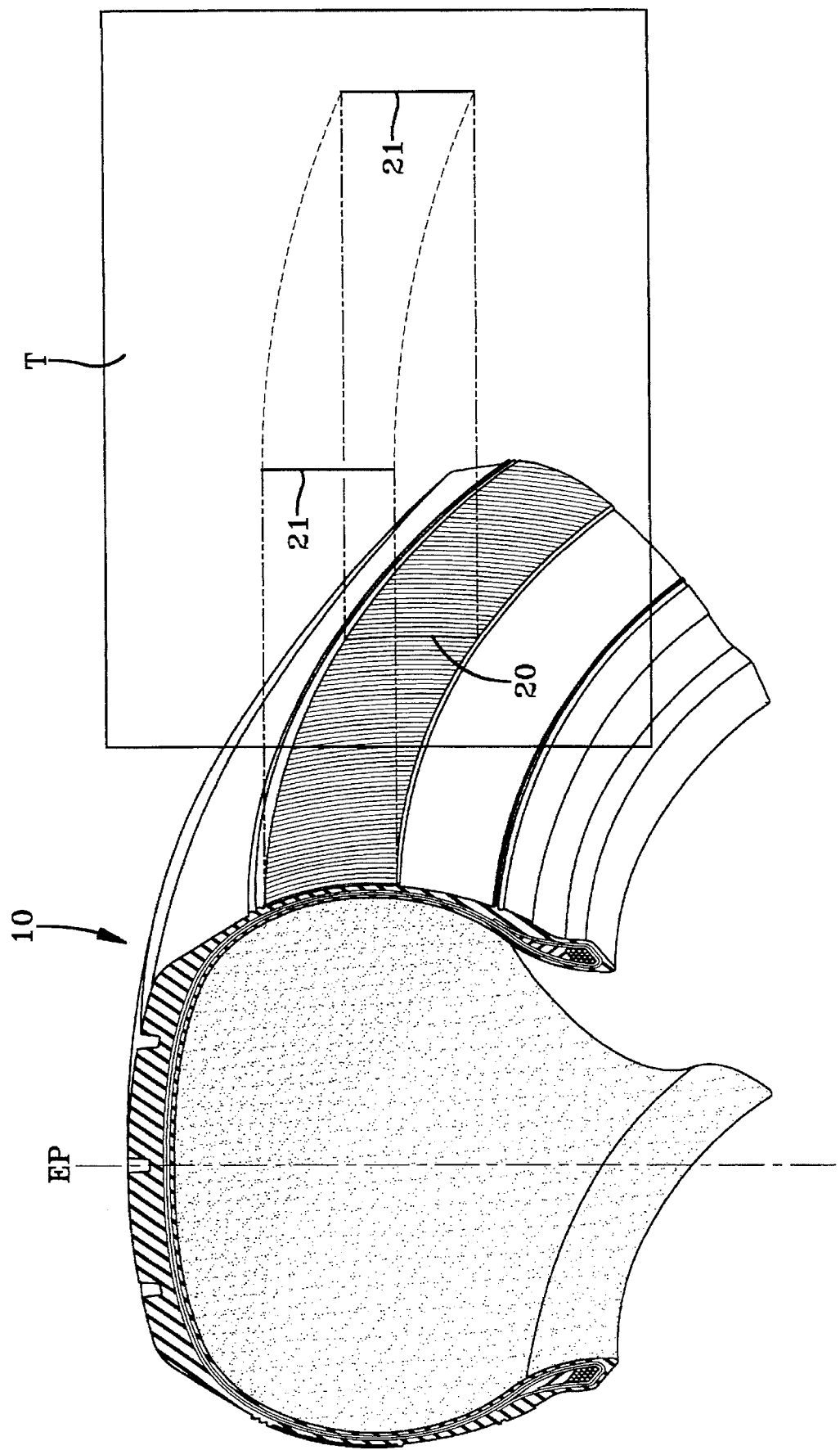
FIG. 6 is a view showing the plane (T) and projected lines 21.

If one places a plane (T) parallel to the equatorial plane of the tire 10 and perpendicular to the axis of rotation then planes perpendicular to the plane (T) and aligned with and passing through the ridges 20 of the first pattern 15 would at the intersection of plane (T) form lines 21 each line 21 being parallel and having the same slope within a given sector 13, the lines 21 being projected onto the plane (T) as shown in FIG. 6.

As illustrated the lines 21 are straight having a constant slope (x/y). Alternatively, the ridges 20 and lines 21 can be slightly curved thus having a changing slope as long as the slopes of all the lines 21 of the first pattern 15 are all the same relative to the other lines 21 within a sector 13 for any particular radial location. In other words, if a radius R was moved through all the ridges of the first pattern 15, the slope (x/y) of all the ridges 20 at the intersection of the radius (R) would be the same.

In FIG. 5A the lettering of the second design pattern 17 is shown superimposed over the first pattern. In this preferred embodiment the lettering has a second pattern of ridges 30. The ridges 30 have the same slope and are all parallel. The ridges 30 of the second design pattern 17 are oriented in the range of 45° to 90° relative to the ridges 30 of the first design pattern 15, the ridges 30 of the second design pattern 17 oriented at 90° relative to first pattern being most preferred.

In FIG. 4 when multiple sectors 13A, 13B, 13C and 13D are used, it is possible to match the angular orientation of the ridges 20 of the lettering in one sector 13 to the orientation of the ridges 20 of the first pattern of another sector 13. The use of four sectors 13A, 13B, 13C and 13D enables the ridges 30 of the lettering in one sector 13 to be matched to the background pattern ridges 20 of the adjacent sectors 13. This is particularly useful when the ridges 20, 30 of the first pattern 15 and second pattern 17 are arranged perpendicular relative to the other within a sector 13 because the lettering ridges 30 in the upper and lower sectors 13A and 13C can be matched in contrast to the background ridges 20 in the left and right sectors 13B and 13D while simultaneously the background ridges 20 in the upper and lower sectors 13A and 13C can match in contrast the lettering ridges 30 of the left and right sectors 13B and 13D should such ridges 30 be used in forming the lettering in those sectors 13B and 13D. This matching creates a vivid light-shadow contrasting appearance which enables the entire lettering in each sector 13 to be easily read at a glance.

Figure 7:
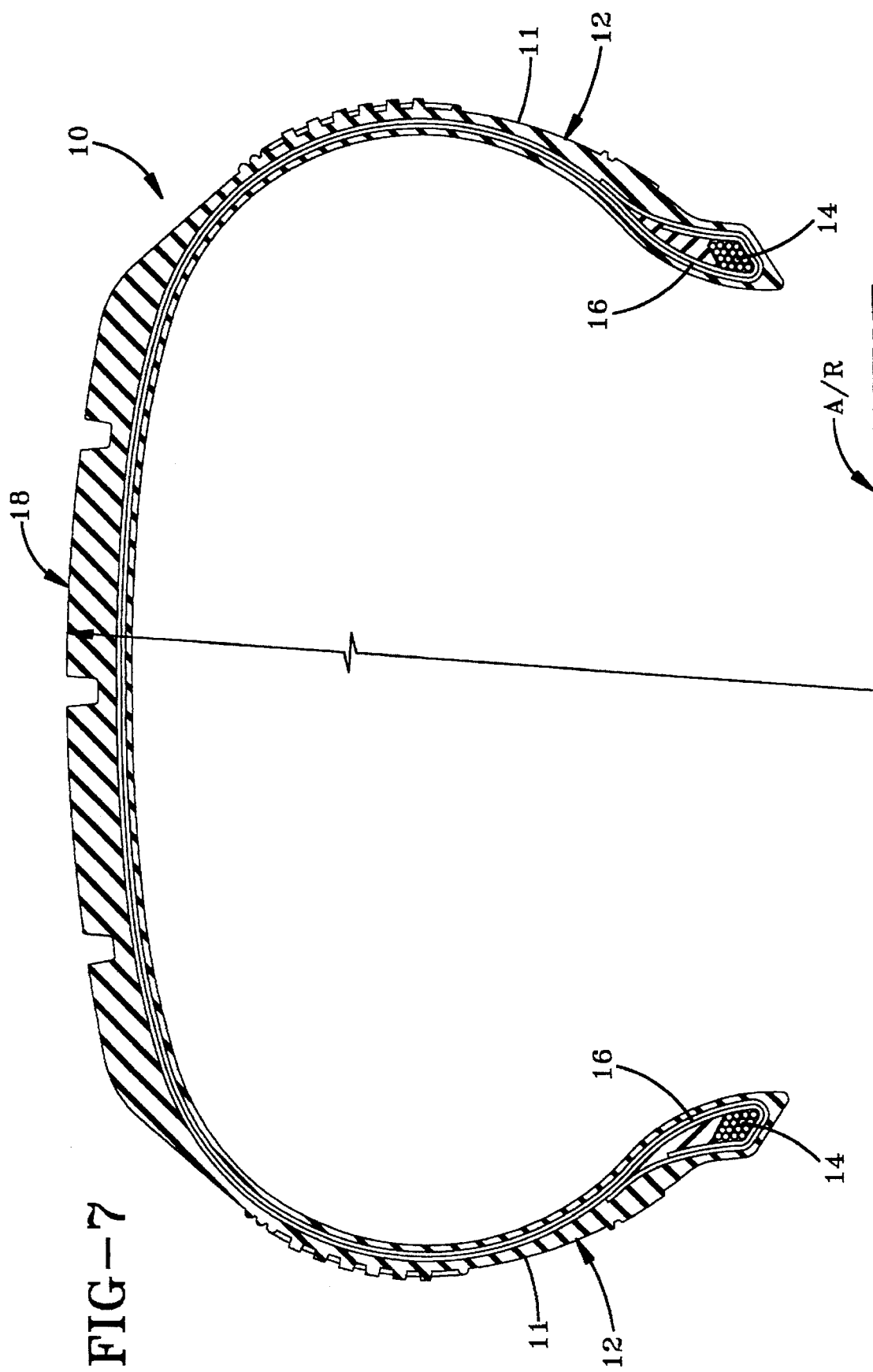
FIG. 7 is a cross sectional view of the tire of FIG. 4.

FIG. 7 illustrates a cross section of a tire 10 employing the sidewall design feature discussed above.

FIG. 7 illustrates a cross sectional view of the tire 10 of FIG. 4 taken along lines 7—7. The tire 10 has an axis of rotation (A/R), a pair of annular beads 14, carcass plies 16 wrapped around the annular beads 14, a tread 18 disposed over the carcass plies 16 in a crown area of the tire and sidewalls 12 disposed between the tread 18 and the beads 14. A sidewall 12 of the tire 10 has the first and second design patterns 15, 17 located on the exterior surface 11 of the sidewall. FIG. 7A illustrates the cross section and plane (T) parallel to the equatorial plane and perpendicular to the axis (A/R).

Figure 8A:
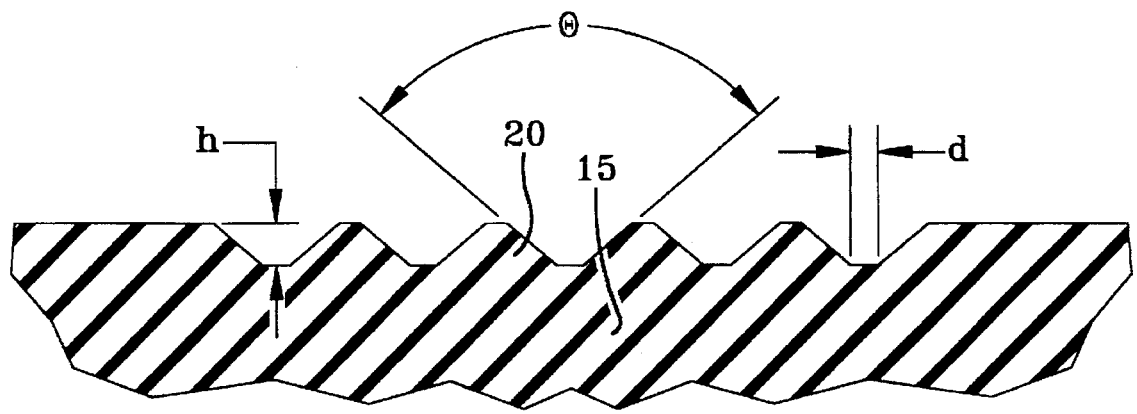
FIG. 8A is a cross sectional view of the first pattern.
Figure 8B:
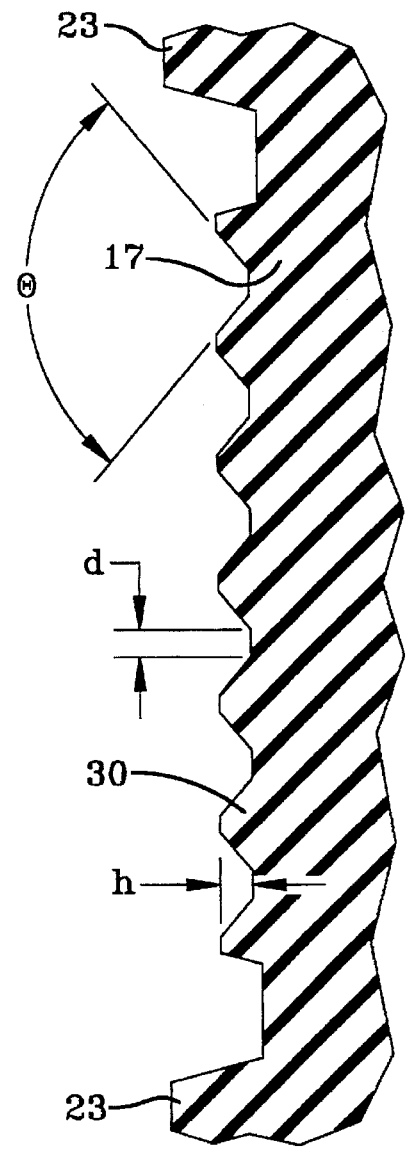
FIG. 8S is a cross sectional view of the second pattern.

FIG. 8A and 8B illustrate a cross sectional view of a portion of the ridges 20, 30 of the first design pattern 15 and the second design pattern 17 respectively. Through a series of empirical studies it was determined that the adjacent ridges 20, 30 ideally should be substantially triangular in shape and that the sides of the adjacent ridges 20, 30 should form an included angle θ of about 100°. This angular relationship θ, in combination with the spacing of each adjacent ridge a distance (d), (d) being less than or equal to the height (h) of the ridge provides a wide angle for impinging light to be reflected back to the observer. It is believed that the angle θ should be in the range of 70° to 130°, preferably 90° to 110° with 100° being most preferred.

Figure 9:
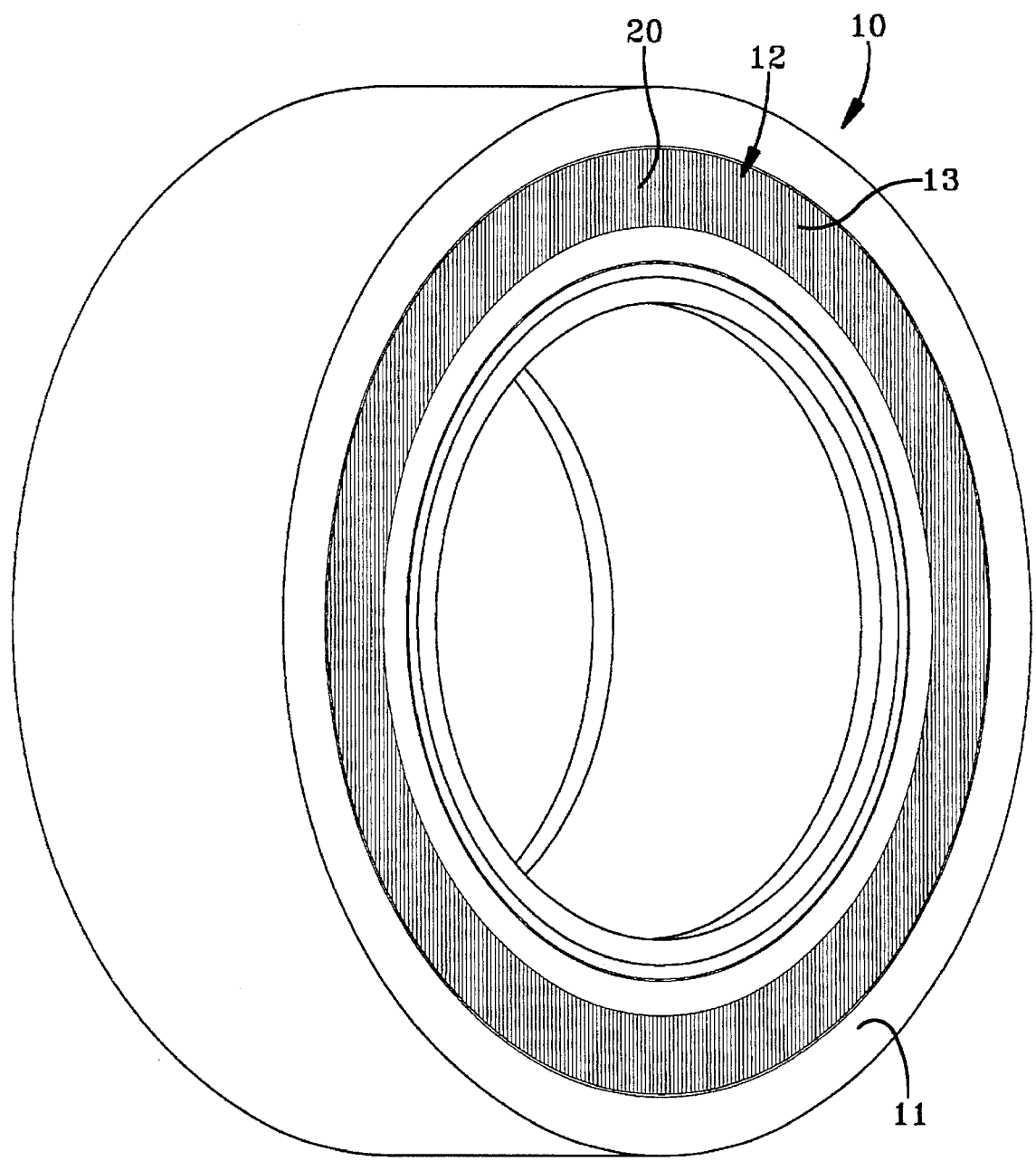
FIG. 9 illustrates a side view of an alternative embodiment tire according to the invention.

FIG. 9 shows the tire 10 of the present invention sidewall 12 wherein the sector 13 is the whole circumferential extend. In this application the ridges 20 of the first pattern 15 will effectively provide a highly reflective background when the ridges 20 are about horizontal, that is when the first pattern of ridges 20 is oriented at 90° relative to a vertical line. When the tire 10 is rotated 90° the first pattern 15 of ridges 20 are vertically oriented and exhibits the shadow or non-reflective look. When the second pattern 17 of lettering is superimposed over this background pattern and has its ridges 30 perpendicularly extending in relation to the background ridges 20 as shown in sectors 13A and 13C of FIG.

4 then the lettering will yield just the opposite contrasting conditions making the lettering appear to be akin to a flashing electric sign with the lettering flashing on when the background is off and vis versa as was previously discussed.

It can be appreciated that the features described above are very novel and provide an opportunity to dramatically display the manufacturers trademarks in a fashion heretofore unachievable. This invention employs the use of light and the black sidewall surface of a tire to accomplish a dramatic appearance. The prior art inventions have used colored lettering usually white to achieve contrast. The present invention is a remarkably efficient use of light and shadow which enables the observer to see all the lettering with the same contrast within a sector 13.

The invention as described above shows the use of parallel ridges 30 to form the lettering of the second pattern 17 as shown in sectors 13A and 13C, the lettering being bounded or outlined with a protrusion 23 of rubber which is slightly greater or equal in height than the ridges 30 within the second design pattern 17.

Alternatively, the lettering can be protruding or recessed flat or solid surfaces 25 superimposed over the first design pattern 15 of ridges 30 as shown in sectors 13B and 13D of FIG. 4. This enables the lettering to be highly contrasting in the orientation when the background is highly reflecting light and alternatively when the background is in effect shadowing and nonreflecting these solid letters are camouflaged being almost indistinguishable from the background. As shown in FIG. 4 this can be used where the name of the product is wanted to be prominent but other information such as tire size or rotation takes on a less prominent value as shown in sectors 13B and 13D. This example shows the value of the inventive concept when employed with conventional lettering to create additional artistic and creative styling opportunities for the tire designer.

What is claimed is:

1. In a tire having a tire sidewall that has an annular outer surface, the annular outer surface having a design pattern, the design pattern having a first design pattern, the first pattern having a plurality of ridges of similar cross sectional shape, each ridge of the first pattern being inclined relative to the circumferential direction; a second design pattern superimposed over a portion of the first design pattern, wherein the improved tire sidewall is characterized by:

a plurality of circumferentially adjacent sidewall sectors extending circumferentially around the tire sidewall annular outer surface, each sector having a first design pattern and a second design pattern, the first design pattern within each sector having parallel ridges oriented in the range of 45° to 90° relative to the orientation of the parallel ridges of the first design pattern within a circumferentially adjacent sector and wherein parallel planes aligned with and passing through the ridges of the first pattern and perpendicular to a plane (T), plane (T) being parallel to the equatorial plane and perpendicular to the axis of rotation of the annular tire sidewall, form lines at the intersection of plane (T) and the parallel planes, the lines being parallel and all having the same slope.

2. The tire of claim 1 wherein the ridges of the first pattern have a substantially triangular cross sectional shape having an included angle at the apex of about 100°.

3. The tire of claim 1 wherein the second pattern has a plurality of spaced ridges, within a sidewall sector each ridge being substantially parallel to an adjacent ridge of the second pattern and extending radially outwardly from the first pattern and in an angular direction between 45° and 90° relative to the ridges of the first pattern within the sector so that when the first pattern appears shiny or highly light reflective, the second pattern appears dark, and conversely when the second pattern appears shiny or highly light reflective, the first pattern appears dark, yielding an inverse contrast between the first and second pattern.

4. The tire of claim 3 wherein the plurality of sidewall sectors has the parallel ridges of the second design pattern within at least one sector oriented parallel to the ridges of the first design pattern within another sector.

5. The tire of claim 4 wherein between each sidewall sector is a circumferential end, the end being a design pattern creating a circumferential space between adjacent sectors.

6. The tire of claim 4, wherein one sidewall sector has the second design pattern being superimposed over the first design pattern and being in the form of lettering, numerals or any other type indicia having a substantially flat surface, the sidewall sectors circumferentially adjacent the one sector having a second design pattern of parallel ridges.

7. The tire of claim 3 wherein the ridges of the second design pattern form lettering, numerals or any other type indicia.

8. The tire of claim 1 wherein the sidewall has four sidewall sectors.

9. The tire of claim 1 wherein the parallel ridges of the first design pattern within circumferentially adjacent sectors are oriented perpendicular relative to the ridges of the first design pattern of a circumferentially adjacent sector.

10. The tire of claim 1 wherein the second design pattern forms lettering, numerals or any other type indicia having a flat radially outer surface.

* * * * *